US006326754B1

(12) United States Patent
Mullet et al.

(10) Patent No.: US 6,326,754 B1
(45) Date of Patent: Dec. 4, 2001

(54) WIRELESS OPERATING SYSTEM UTILIZING A MULTI-FUNCTIONAL WALL STATION TRANSMITTER FOR A MOTORIZED DOOR OR GATE OPERATOR

(75) Inventors: Willis J. Mullet, Pensacola Beach; Yan Rodriguez, Pace, both of FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 09/493,523

(22) Filed: Jan. 28, 2000

(51) Int. Cl.[7] ................................ H02P 1/00; G05B 5/00

(52) U.S. Cl. .......................... 318/480; 318/266; 318/282; 318/286; 318/445; 318/466

(58) Field of Search .................................... 318/280–289, 318/430–469, 266, 275, 265, 264, 471, 470, 603, 480; 49/31, 29, 30, 197, 199, 200, 26; 340/330, 286.11, 555, 356

(56) References Cited

U.S. PATENT DOCUMENTS

| | | | | |
|---|---|---|---|---|
| 3,783,556 | * | 1/1974 | Cook . | |
| 3,825,809 | | 7/1974 | Gatland et al. | 318/282 |
| 4,119,896 | | 10/1978 | Estes, III et al. | 318/266 |
| 4,197,675 | * | 4/1980 | Kelly . | |
| 4,247,806 | | 1/1981 | Mercier | 318/267 |
| 4,357,564 | * | 11/1982 | Deming et al. . | |
| 4,607,312 | | 8/1986 | Barreto-Mercado | 361/172 |
| 4,808,995 | | 2/1989 | Clark et al. | 340/825.69 |
| 4,922,168 | * | 5/1990 | Waggamon et al. . | |
| 4,988,992 | * | 1/1991 | Heitschel et al. . | |
| 5,027,553 | * | 7/1991 | Vergara . | |
| 5,086,385 | | 2/1992 | Launey et al. | 364/188 |
| 5,596,840 | * | 1/1997 | Teich . | |
| 5,604,478 | * | 2/1997 | Grady et al. . | |
| 5,751,224 | | 5/1998 | Fitzgibbon | 340/825.22 |
| 5,752,343 | * | 5/1998 | Quintus . | |
| 5,789,887 | | 8/1998 | Elischewski | 318/468 |
| 5,848,634 | | 12/1998 | Will et al. | 160/310 |
| 5,864,134 | | 1/1999 | Burgess | 250/221 |
| 5,864,297 | | 1/1999 | Sollestre et al. | 340/825.31 |
| 5,872,513 | | 2/1999 | Fitzgibbon et al. | 340/539 |
| 5,933,086 | | 8/1999 | Tischendorf et al. | 340/825.31 |

(List continued on next page.)

*Primary Examiner*—Paul Ip
(74) *Attorney, Agent, or Firm*—Renner, Kenner, Greive, Bobak, Raylor & Weber

(57) ABSTRACT

A wireless operating system (10) utilizing a multi-functional wall station (12) for a motorized door/gate operator includes an operator (50) for controlling the movement of a door/gate (54) between various positions. The system has an operator with a receiver (56) and a wall station transmitter (12) for transmitting a signal (42) to the receiver. The signal initiates separate operator functions in addition to opening and closing of the door/gate. A remote transmitter (70) may send a remote signal (74) received by the receiver, wherein the receiver is capable of distinguishing between the wall station signal (42) and the remote signal (74). The wall station includes a transmitter programming button (24), wherein actuation of the transmitter programming button places the wall station transmitter in a learn mode, and wherein subsequent actuation of the remote transmitter positively identifies the remote transmitter for use with the wall station. A light (66) powered by the operator and a light actuation button (18) provided by the wall station transmitter is included in the system. Actuation of the light actuation button (18) functions to switch the light on or off. A pet height button (22), provided by the wall station transmitter, selectively positions the height of the gate/door (54) from its fully closed position to allow ingress and egress of a pet. A delay-close button (20) closes the door/gate after a predetermined period of time. Actuation of a door installation button (28) sequences the door/gate and said operator through various operational parameters to establish a door operating profile. A keyless entry transmitter (80) and a second wall station may also control the operator.

11 Claims, 2 Drawing Sheets

U.S. PATENT DOCUMENTS

| | | | | |
|---|---|---|---|---|
| 5,936,544 | | 8/1999 | Gonzales et al. | 340/825.34 |
| 5,969,637 | | 10/1999 | Doppelt et al. | 340/825.69 |
| 6,051,947 | * | 4/2000 | Lhotak et al. . | |
| 6,097,166 | * | 8/2000 | Fitzgibbon et al. . | |
| 6,107,765 | * | 8/2000 | Fitzgibbon et al. . | |
| 6,111,374 | * | 8/2000 | Fitzgibbon et al. . | |
| 6,133,703 | * | 10/2000 | Fitzgibbon et al. . | |

* cited by examiner

WIRELESS OPERATING SYSTEM UTILIZING A MULTI-FUNCTIONAL WALL STATION TRANSMITTER FOR A MOTORIZED DOOR OR GATE OPERATOR

TECHNICAL FIELD

Generally, the present invention relates to a garage door operator system for use on a closure member moveable relative to a fixed member. More particularly, the present invention relates to a wireless wall station transmitter for controlling the operation of a closure member, such as a gate or door, between a closed position and an open position. More specifically, the present invention relates to a wireless wall station control for a door or gate operator, wherein the wall station has a plurality of buttons or touch pad keys each of which sends a distinct signal to an electronic control module, containing a receiver, to implement the desired function of the operating system.

BACKGROUND ART

As is well known, garage doors or gates enclose an area to allow selective ingress and egress to and from the area. Garage doors initially were moveable by hand. But due to their weight and the inconvenience of opening and closing the door, a motor was connected to the door. Control of such a motor is provided by a hard-wired push button which, when depressed, starts the motor and moves the door in one direction. When the button is pressed again, the motor moves the door in an opposite direction. Garage door operators are now provided with safety features which stop and reverse the door travel when an obstruction is encountered. Other safety devices, such as photocells and sensors, detect whenever there is an obstruction within the path of the door and send a signal to the operator to take corrective action. Remote control devices are now also provided to facilitate the opening and closing of the door without having to get out of the car. The prior art also discloses various other features which enhance the convenience of opening and closing a garage door as follows.

U.S. Pat. No. 4,119,896, to Estes, III et al., discloses a sequencing control circuit provided for a door operator motor which is connected to open and close a garage door as controlled by signals from manual switches and load switches. The sequencing control circuit includes time means with a first time period in the order of six to eight seconds. This permits a person to hold a push button switch closed for about six to eight seconds so that a slab door may be opened against a snow drift which otherwise would have so much torque requirement on the motor that an overload switch would stop the motor. Enabling means is provided to enable the motor during this time period yet to disable the constant signal from the push button for periods longer than this time period so that the door operator motor then is responsive to signals from the load switches. The sequencing control circuit also includes a latch circuit having an output in a feed back loop to maintain the latch circuit latched upon a momentary input control signal. This allows time for the motor to accelerate the load to a normal running condition and to open any closed limit switch or closed torque switch during this acceleration period.

U.S. Pat. No. 4,247,806, to Mercier, discloses a garage door opener including a radio receiver and a push button, each operable to initiate a pulse for effecting a switching device which, in turn, energizes a latching relay. Operation of the latching relay completes an energizing circuit to the appropriate winding of a reversible motor which moves the door toward an open or closed position. A sensing circuit is operable for effecting the reversal of the latching relay to change the direction of motor operation in the event the door engages an object in its path. A foot switch may also be provided for positively sensing an obstacle and reversing the drive motor. A transmitter may be provided with an impulse circuit to limit the duration of the system actuating signal regardless of how long the transmitter push button is depressed.

U.S. Pat. No. 4,607,312, to Barreto-Mercado, discloses a system that eliminates the conventional automobile door and trunk locks and provides power operated locks remotely controlled by a VHF radio transmission which is coded with two code signals, one of which energizes the door locks to locking condition and the other of which causes door or trunk unlocking, the trunk unlocking being activated only if a trunk transfer push button switch has been operated. The unlocking code may also activate the electric power to the engine starter motor, hood and manual switches of the power door operating motor. The system provided by the invention for unlocking or locking the doors of an automobile and for unlocking the trunk and hood of the same automobile as well as the engine electric power, all from outside the automobile permits the removal of the conventional mechanical door locking mechanism, including both the external key-operated apparatus and that controlled by an internal push button, and the removal of the conventional key-operated mechanical trunk lock, and the substitution of an externally operable radio controlled lock and unlock system for the door and an unlock system for the trunk and hood.

U.S. Pat. No. 4,808,995, to Clark et al., discloses a radio remote-controlled door operator for use, among other uses, as a residential garage door operator. The transmitter contains two buttons, one to produce normal door operation and the other to set the operator into a "secure" mode, wherein it will be non-responsive to further valid operating codes until reset. In addition, a second deeper level of security may be established by means of a vacation switch which disconnects the operator from the AC power supply. The operator system comprises a microprocessor which is programmed to perform various accessory functions even through the accessories may not be present. Various microprocessor inputs are tied to a false "safe" level so that even though the accessory programs are run, no outputs result and no interference with normal door operation is produced.

U.S. Pat. No. 5,086,385, to Launey et al., discloses a system for and a method of providing an expandable home automation controller is disclosed which supports multiple numbers and multiple different types of data communications with both appliances and subsystems within the home as well as systems external to the home. The system is based upon a central processor, such as a microprocessor-based computer, and is connected by means of a data bus to control the various products and subsystems within a home or commercial building, such as lighting systems, security systems, various sensors, multiple external terminals, as well as to allow for the input of commands by a variety of means such as touch-screens, voice recognition systems, telephones, custom switches or any device capable of providing an input to a computer system. The system functions can be readily controlled by the user utilizing a high resolution graphics display and associated touch-screen interface.

U.S. Pat. No. 5,848,634, to Will et al., discloses an apparatus for controlling operation of a motorized window shade, the apparatus comprising a drive circuit for driving an electric motor operating the window shade; a control circuit for controlling the operation of the driver circuit, the control circuit including a microprocessor. The microprocessor is coupled to first and second switches for enabling driving of the electric motor in respective first and second directions corresponding to upward and downward movement of the window shade. The apparatus also includes a program switch, wherein the microprocessor of the control circuit is programmed to allow setting of the upper and lower limits of travel of said window shade. The microprocessor is also programmed with a program to set a first of said limits of travel. The window shade is adjusted to a desired upper or lower level limit position using at least one of said first and second switches, the program switch is then actuated followed by the actuation of one of said first and second switches to set a first of the limits. The window shade is then adjusted to a desired position for a second of the limits using at least one of said first and second switches. The program switch is again actuated, and the other of said first and second switches is actuated to set said second of said limits.

U.S. Pat. No. 5,864,297, to Sollestre et al., discloses a remote keyless entry system including a remote key fob or transmitting unit which may be carried by the user. This fob may transmit coded function signals directing the vehicle to perform requested functions, e.g., unlock the doors, and an on-board receiver that receives the request and performs the function. The receiver may be reprogrammed by the customer to accept signals from a different transmitter in the event that a key fob is either lost or stolen. To program the receiver, the system is put in a programming mode by using a transmitter whose security code is already stored within the receiver. This programming mode is entered by depressing specified buttons on the transmitting unit for a predetermined amount of time. Once in the programming mode, all previous security codes are erased, and a new transmitting unit code may be programmed into the receiver by depressing any button on that unit. The receiver will chime to acknowledge to the customer that the new security code has been accepted.

Although the above systems are effective in their stated purpose, there are still several inconveniences in the set up and use of a garage door or gate which utilizes a motorized operator. It is believed that there are no operator systems which provide a pet height feature to allow ingress and egress of pets. The current practice to set the door opening to a height that will allow pet access to the garage without creating an opening enough to allow unauthorized access by a person, is accomplished by depressing the open/close button during closing of the door and then depressing the open/close button again to open the door to the desired height and then pressing the button again to stop the door. With current operator designs, the door will stop and reverse if the open/close is depressed a second time when the door is closing. If the door is opened too high, it must be closed before trying to re-set the height.

Garage door operators are also difficult to set up inasmuch as a ladder is required to manually access the operator to set the various codes for remote controls and the up/down limits of the door travel. Accordingly, in addition to having to stand on a ladder, the set-up mechanic must be in close proximity to the operator during its set-up. This is a dangerous situation if the operator is improperly installed. Likewise, when additional remote controls are programmed for use with the operator, switches on the operator must be set directly, which usually requires the need for a visit from qualified service personnel. For example, the current practice of setting the transmitter codes is by depressing a learn button on the operator housing and a light illuminates when the receiver is ready to learn the transmitter code. The transmitter send button is then depressed, sending the code that is then stored in the operator's receiver memory. With the operator suspended from the ceiling, one must normally use a ladder to reach the learn button to accomplish this programming.

DISCLOSURE OF INVENTION

It is thus an object of the present invention to provide a wireless transmitter for a door or gate that moves between an open and closed position. The door or gate is of the type that is moveable into an out-of-proximity with a fixed surface that is to be sealed relative to the door. The door or gate is coupled to a motorized operator which controls movement of the door. It is another object of the present invention to provide a wireless wall station transmitter which provides multiple functions in addition to the open/close function initiated by the motorized operator. It is a further object of the present invention to provide a wireless wall station transmitter device which is powered by a battery. It is yet another object of the present invention to provide a wireless wall station transmitter which is mountable anywhere in range of the motorized operator which controls the up and down movements of the door or gate and various other features associated with the door.

It is yet another object of the present invention to provide a receiver coupled to the motorized operator to decode instructions sent from the wall station transmitter. It is still another object of the present invention to provide a receiver which is capable of distinguishing between radio-frequency signals from the main wall station, other remote transmitters, other keyless entry access points, and other wall stations. It is still a further object of the present invention to provide a receiver which can handle multiple function instructions.

It is an additional object of the present invention to provide a multi-functional wall station which provides functions in addition to the opening and closing of the door or gate. It is still yet another object of the present invention to provide a wall station which allows for setting of transmitter codes from the wall station, thus eliminating the need to manually program the operator. Yet another object of the present invention is to provide a receiver associated with the operator which is able to distinguish between transmitting devices.

A further object of the present invention is to allow for an operator which has a set pet height or which can be programmed to a desired pet height setting. Still yet another object of the present invention is to provide a door close delay function which allows egress from the enclosure when the door is in a full-up position and then closes the door or gate after a set time period. Still yet a further object of the present invention is to allow for establishment of an operational profile and an initial set-up to establish upper/lower limits of the door from the wall station. Still another object of the present invention is to allow for application of a constant pressure force to the up/close button to allow for opening of the door in the event of malfunctions with the springs or cables used to raise the door.

Yet still a further object of the present invention is to provide a radio controlled wireless wall station for controlling the operational parameters of a door or gate operator that contains a plurality of buttons or keys to provide a plurality of functions and features. The wall station transmits an initial signal that sets a series of coded signals during installation and once the encoded series is set, each additional coded message within the coded set designates a separate friction. These functions include, but are not limited to, the directional directional movement of the object being motorized; the off and on function of the lights associated with the operator, the initiation of an operational profile, which is used to establish safety limits and the like; the initiation of a delay-to-close time; the raising of the door to a height that allows pet egress; and the learn function programming of additional remote transmitters and remote keyless entry pads.

In general, the present invention contemplates a wireless multi-functional wall station for a motorized door/gate operator having an operator for controlling the movement of a door/gate between various positions, the operator having a receiver, and a wall station transmitter for transmitting a signal to the receiver, the signal capable of initiating separate operator functions in addition to opening and closing of the door/gate.

BRIEF DESCRIPTION OF THE DRAWINGS

For a complete understanding of the objects, techniques and structure of the invention, reference should be made to the following detailed description and accompanying drawings, wherein.

PREFERRED EMBODIMENT FOR CARRYING OUT THE INVENTION

Figure 1:
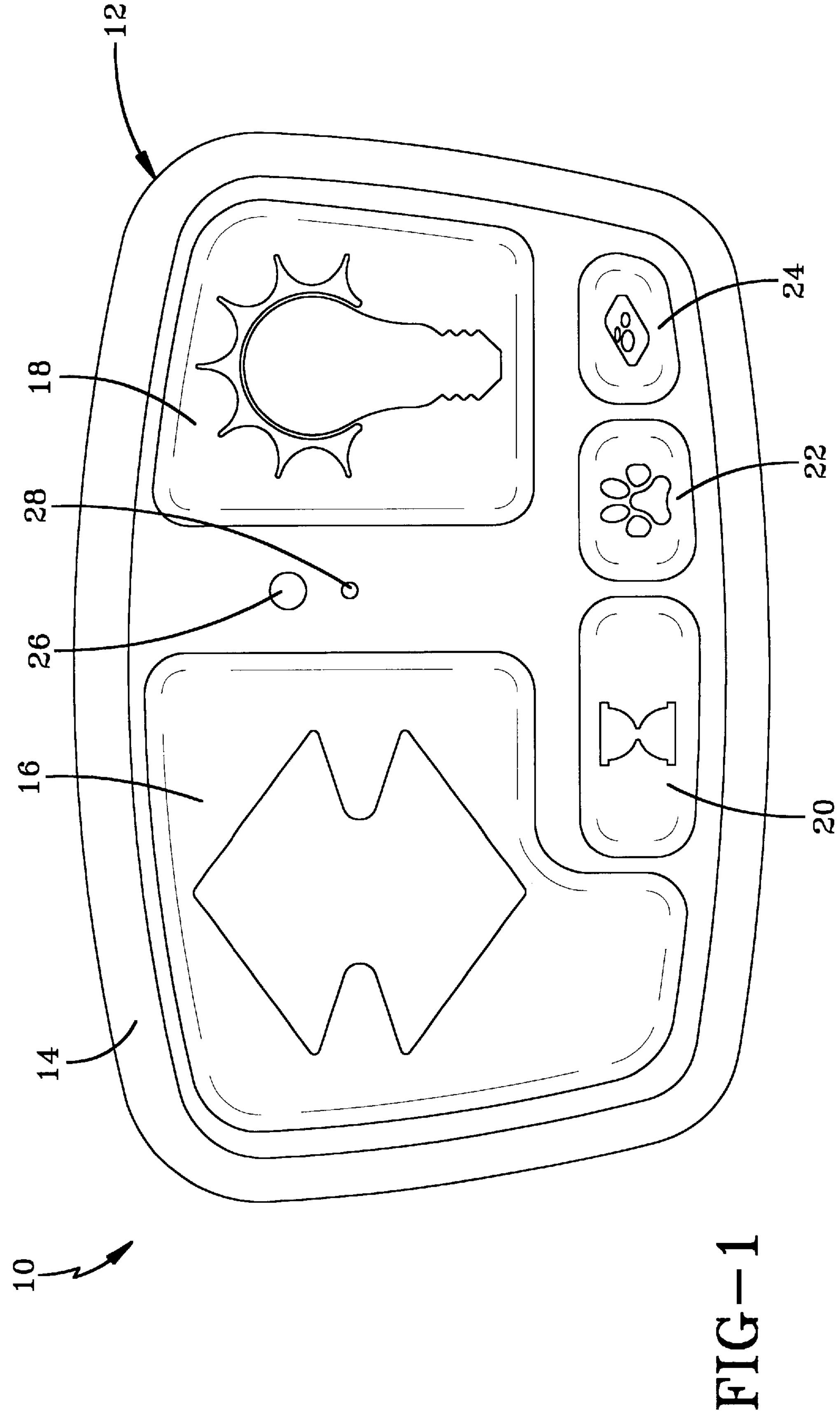
FIG. 1 is an elevational view of a multi-function wall station embodying the concepts of the present invention.
Figure 2:
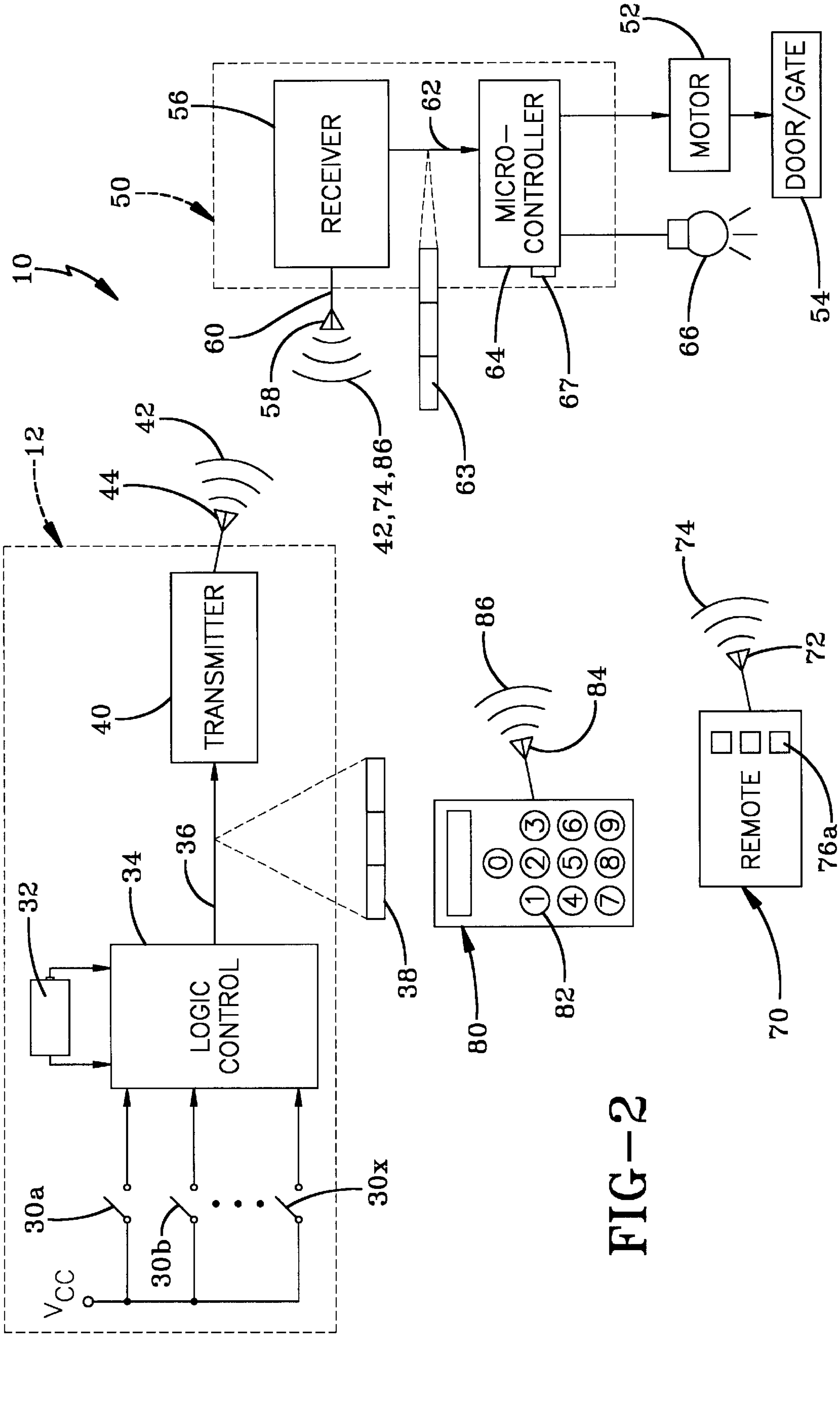
FIG. 2 is a schematic diagram of the wireless operational system for motorized door or gate operators according to the present invention.

A wireless operating system for a motorized door or gate operator according to the concepts of the present invention, depicted in FIGS. 1 and 2 of the drawings, is generally indicated by the numeral 10. The system 10 may be employed in conjunction with a wide variety of doors or gates, wherein the doors are of the type utilized in garages, commercial and utility buildings, and other structures, as well as windows or other closure members, all of which may be linear, curved, or otherwise non-linear, in whole or in part. Such doors or other members are commonly constructed of a variety of materials such as wood, metal, various plastics, or combinations thereof The lower extremity of doors or other member of these various types may be substantially rectangular or may be profiled in any number of ways for the positioning of reinforcing members or other purposes. In the preferred use, the present invention is utilized with residential-type garage doors. Generally, the system 10 of the present invention employs a multi-function wall station generally designated by the numeral 12 in FIG. 1. The wall station 12 is typically placed near a door that enters the garage from the interior of the house and is positioned at a convenient height. The wall station 12 includes a housing 14 typically made of polymeric material, wherein at least a portion of the housing is removable to allow access to the internal workings thereof when needed.

The housing 14 provides a plurality of buttons to control the operation of the door in which it is associated. These buttons include an open/close button 16, a light on/off button 18, a delay-close button 20, a pet lock button 22, and a transmitter program button 24. The positioning and configuration of the buttons 16–24 may be as shown or they may be configured in other manners as deemed appropriate. Of course, other function buttons or only some of the aforementioned buttons may be provided by the housing 14. Additionally, the buttons may be color-coded or provided with identifying indicia to facilitate ease of use.

The housing 14 may include a light-emitting diode (LED) 26 which is used to indicate various stages of operation or modes of the wall station 12. The housing 14 also includes a program access hole 28, wherein certain programming features are only needed for specific, limited-use functions, and are not needed during general use of the wall station. The hole 28 is configured so as to allow access by only a special tool for the sole purpose of programming various functions associated with the wall station and the operating system.

As shown in FIG. 2, the wall station 12 includes a plurality of switches 30, wherein the alphabetic suffixes correspond to respective buttons 16–24 and the hole 28 provided by the housing 14. For example, pressing or actuation of button 16 momentarily closes the switch **30*a* and initiates the opening and closing of a door or gate. Application of constant pressure to any of the buttons is not needed, although in some instances—as will be explained later—application of constant pressure and, thus, closure of a switch for an extended period provides an additional function to the wall station 12**.

A power supply 32, which is typically a dry cell battery, provides the necessary power for operation of the wall station 12. Use of a battery allows for the wall station to be placed anywhere within range of the operator and eliminates the need for obtaining power from the operator. If desired, although not preferred, the wall station could be connected to an electrical outlet to provide the necessary power. The wall station 12 includes a logic control circuit 34 which contains at least some of the necessary circuitry, including hardware, software, and memory for operating the system 10. Depending upon the buttons 18–24 actuated or upon actuation of the programming feature accessed via the hole 28, the logic control circuit 34 generates a signal 36 which is converted into a code that may be broken down further into a stream of identification codes 38 that is then sent to a transmitter 40. The transmitter 40 converts the codes 38 into an appropriate radio frequency signal 42, which is broadcast by an antenna 44. The signal 42 is generated at a frequency commonly used for garage door operating systems.

A garage door operator, which is designated generally by the numeral 50, controls the operation of a motor 52 that controls the opening and closing motions of a door or gate 54. In a residential setting, the garage door operator 50 and the motor 52 is suspended from a ceiling and is centrally located in relation to the door or gate 54. Examples of such a configuration can be seen in U.S. Pat. No. 5,929,580, which is incorporated herein by reference.

The operator 50 includes a receiver 56 and an antenna 58 for receiving the radio frequency signal 42 generated by the wall station transmitter 40. The receiver 56 converts any received radio frequency signal 60 into a code 62 which is then transmitted to a microcontroller 64. The microcontroller 64 includes the necessary circuitry, hardware, software, and memory for controlling the operation of the motor 52 and, thus, the movement of the door/gate 54. The code 62 may be broken down into a stream of identification codes 63 and is virtually identical to the code 38 transmitted by the wall station 12. Typically, the operator 50 is powered by 120 volt AC service provided to a residential or other site.

The microcontroller 64 powers an LED 67 that flashes to indicate entry into various programming modes. Also included in the system 10 may be a remote transmitter, generally designated by the numeral 70. The remote transmitter 70 includes an antenna 72 for transmitting a radio frequency signal 74 received by the antenna 58. The remote transmitter may include multiple buttons 76 for controlling or sending signals to more than one operator.

Yet another device which may be included in the operator system 10, is a keyless entry pad, generally designated by the numeral 80. The pad 80 includes a plurality of alpha-numeric keys 82 which allow entry of a security code to gain access to the garage or other enclosure. The pad 82 includes an antenna 84 for transmitting a radio frequency signal 86 to the antenna 58. The keyless entry pad 80 is typically installed outside of the enclosure in range of the operator 50.

Once the garage door, motor, and operator are installed in place, the wall station 12 is placed in a convenient location. The set-up mechanic then initiates a set-up procedure to set the upper and lower limits of the door travel and also to set an operational profile. As discussed in U.S. Pat. No. 5,929,580, the operational profile is regularly updated and employed as a safety feature to stop travel of the door in the event of an obstruction. In any event, setting of the operational profile and the door travel limits is accomplished by inserting a tool (not shown) into the access hole 28. This actuates a hidden door installation button that starts the door travel in either the up or down direction, depending upon its initial placement. Once one of the limits is set, the motor and door reverse direction to determine where the other limit is located. The door then repeats the open/close cycle to set the operational profile and, upon completion of the procedure, the profile is set. Briefly, the operational profile is sequence of force measurements for incremental door positions in either direction of door travel. During regular operation, if a force measurement at a particular door position is outside of an acceptable force measurement range, the door is at least stopped and, if desired, reversed. Upon completion of each successful door travel cycle, the operational profile is updated. This allows for any minimal changes in force, such as motor wear, to be accounted for in the profile. In any event, completion of the procedure may be indicated by flashing of the LED 26. Upon completion of the setup procedure, the door and operator are ready for use. It will be appreciated that use of the foregoing set-up procedure eliminates the need for the mechanic to access programming features that were previously only accessible at the operator. Moreover, the mechanic can now be in a safer location, away from the operator and motor, during set-up.

As is common with existing garage door operators, actuation of the open/close button 16 moves the door in the appropriate direction. Actuation of the button 16 while the door is still traveling will cause the door to stop in place, or stop and reverse if traveling in the downward direction. In the event one of the cables or springs utilized in the operation of the door is broken, constant pressure applied to the button 16 will cause the motor to apply 100% full power to lift the door to an open position. It will be appreciated that in normal operation of the garage door, the motor does not utilize 100% full power so as to allow for soft stopping and starting of the door motion. This mode overrides the operational profile to allow lifting of the door.

Typically, when the garage door is opened or closed, a light 66 associated with the operator will turn on and typically remains on for a set period of time, typically 2 to 5 minutes, and then turns itself off with the presumption that no one is in the garage. Accordingly, if someone is still in the garage and desires to utilize the light 66 associated with the operator 50, they may actuate the light on/off button 18. The light 66 then remains on until someone presses the button 18 again.

In some instances, when a person desires to exit the garage, with the door already in the up position, and they do not have a remote transmitter or other device available to close the garage door, they can actuate the delay-close button 20. This allows the person an opportunity to exit the garage before the door closes. In the preferred embodiment, actuation of the button 20 causes the light 66 to flash on and off every other second for a period of about 8 seconds. The light 66 then remains on for a period of 2 seconds and then the door begins to close. Upon initiation of the door closing, all safety features are available to detect the presence of any obstruction in the path of the closing door. Accordingly, if the person pushing the delay-close button 20 is not out of the way of the closing path of the garage door, the door will reverse upon impact and return to its open position. Of course, other time periods can be set for closing of the door. In this embodiment, such a change in the time period is done in the microcontroller 64.

Actuation of the pet lock button 22, when the door is in the fully close position, opens the door to a predetermined height of six inches above the lower limit of the door. This allows small pets such as cats and small dogs to enter and exit through the six inch opening at their convenience. In the event the owner of the pet desires to set a different size opening for a smaller or larger pet, the opening size can be set anywhere from 1 to 12 inches. This is accomplished by actuating the open/close button 16 until the door is set in its desired position. Then by pressing the up/down button 16 and the pet block button 22 simultaneously, the new height is set. Accordingly, whenever the new size opening is desired, the user presses the pet lock button 22. The microcontroller 64 controls the minimum and maximum pet height openings. It will be appreciated that although the height could be set somewhat higher than 12 inches, anything higher would be unlikely to stop a burglar or the like.

In addition to operating the door from the wall station 12, it will be appreciated that other devices could be used to open and close the door 54. For example, individuals usually use a remote transmitter 70 for each automobile that is stored in the garage. This allows closing of the door when they are leaving and opening the door when they return simply by pressing the button 76 associated with the door to be opened. Alternatively, the keyless entry pad 80 may be provided in range of the operator 50 and placed on the exterior of the garage or house to allow for school children to easily open and close the garage door when returning from school. This is done by entering a four-digit pass code into the keypad 80. Accordingly, the receiver 56 receives the signal from either the remote 70 or pad 80 and opens the door. In order for the operating system 10 to function properly, the operator must be able to distinguish between the codes sent by either the wall station 12, the transmitter 70, or the keypad 80. Additionally, in some instances, it may be desired to have additional wall stations 12. For example, if there are two interior entry doors to the garage, there may be a need for a wall station to be placed near each door. In any event, in order for the operator to distinguish from where the signal is generated and as to what particular function is being requested, each controlling device must be programmed into the microcontroller 64. This is accomplished by first actuating the transmit program button 24 at the wall station 12. This places the system 10 into a "learn mode" indicated by flashing of the LED 76. Next, the device to be associated with the operator 50 is actuated twice. For example, one of the remote buttons 76 is pushed twice. For the keypad entry, the code desired is entered twice. The signals generated by these additional devices are then recognized by the operator. To avoid inadvertent programming, pressing of any other button within about 10 seconds of pressing the button 24 removes the system from the learn mode. In the preferred embodiment, up to six wall stations/remote transmitters/keypad entry devices can be utilized with one operator 50. Of course, more than six devices can be associated with the operator 50 by re-programming or upgrading the microcontroller 64.

Thus, it should be evident that the wireless operating system for motorized doors or gate operators disclosed herein carries out the various objects of the invention set forth hereinabove and otherwise constitutes an advantageous contribution to the art. As may be apparent to persons skilled in the art, modifications can be made to the preferred embodiments disclosed herein without departing from the spirit of the invention, the scope of the invention being limited solely by the scope of the attached claims.

What is claimed is:

1. A door operator system for moving a door, comprising:

a motor for moving the door between opened and closed positions;

an operator for controlling the operation of said motor;

a main wall station, positioned away from said operator, for remotely sending operational signals to said operator, said main wall station having an open/close button for actuating said motor to move the door in the appropriate direction, and said main wall station having a single transmit program button for remotely learning additional transmitters capable of sending operational signals to said operator, wherein said operator is placed in a learn mode by a single actuation of said transmit program button without actuation of any other button on said main wall station; and at least one additional transmitter, for remotely sending operational signals to said operator, wherein said additional transmitter is actuated at least once while said operator is in the learn mode so that said additional transmitter can actuate said motor to move the door in the appropriate direction when not in said learn mode.

2. The system according to claim 1, wherein said additional transmitter must be actuated more than once in a predetermined time period for said additional transmitter to be learned by said operator.

3. The system according to claim 1, wherein actuation of any other button on said main wall station prior to said additional transmitter being actuated more than once removes said operator from the learn mode.

4. The system according to claim 1, wherein said additional transmitter is an alphanumeric keypad that remotely sends operational signals to said operator upon entry of a code, wherein said code is entered more than once while said operator is in the learn mode so that said keypad can actuate said motor to move the door in the appropriate direction when not in said learn mode.

5. A door operator system for moving a door, comprising:

a motor for moving the door between opened and closed positions;

an operator for controlling the operation of said motor; and a main wall station, positioned away from said operator, for remotely sending operational signals to said operator, said main wall station having an open/close button for actuating said motor to move the door in the appropriate direction, and said main wall station having a door installation button for remotely learning an operational profile of the door and door travel limits by said operator, wherein actuation of said door installation button remotely initiates door travel to find a first travel limit, reverses door travel to find a second travel limit and then initiates an open/close cycle to set said operational profile.

6. The system according to claim 5, wherein said operational profile establishes force thresholds for various positions of door travel.

7. A door operator system for moving a door, comprising:

a motor for moving the door between opened and closed positions;

an operator for controlling the operation of said motor; and a main wall station, positioned away from said operator, for remotely sending operational signals to said operator, said main wall station having an open/close button for actuating said motor to move the door in the appropriate direction between door travel limits, and said main wall station having a pet lock button for remotely setting a predetermined distance from one of said door travel limits, wherein actuation of said pet lock button moves the door to said predetermined distance.

8. The system according to claim 7, wherein said predetermined height is remotely set by first actuating said open/close button to move the door to said predetermined height and then simultaneously actuating said open/close button and said pet lock button.

9. A door operator system for moving a door, comprising:

a motor for moving the door between opened and closed positions;

an operator for controlling the operation of said motor;

a main wall station, positioned away from said operator, for remotely sending operational signals to said operator, said main wall station having an open/close button for actuating said motor to move the door in the appropriate direction, said operator having safety features to detect the presence of any obstruction in the path of the door between door travel limits, wherein detection of the obstruction causes the operator to take corrective action; and said main wall station having a delay-close button for remotely initiating a close cycle by said operator, wherein actuation of said delay-close button delays closure of the door for a predetermed period of time, whereupon lapsing of said period of time said operator initiates door closure and enablement of the safety features.

10. The door operator according to claim 9, further comprising:

a light coupled to said operator, said light flashing for a warning period upon actuation of said delay-close button, and said light remaining on for a final warning period just prior to initiation of door closure.

11. A door operator system for moving a door, comprising:

a motor for moving the door between opened and closed positions;

an operator for controlling the operation of said motor;

a main wall station, positioned away from said operator, for remotely sending operational signals to said operator, said main wall station having an open/close button for actuating said motor to move the door in the appropriate direction, and said main wall station having a single transmit program button for remotely learning additional transmitters capable of sending operational signals to said operator, wherein said operator is placed in a learn mode by a single actuation of said transmit program button without actuation of any other button on said main wall station;

an additional transmitter, for remotely sending operational signals to said operator, wherein said additional transmitter is actuated at least once while said operator is in the learn mode so that said additional transmitter can actuate said motor to move the door in the appropriate direction when not in said learn mode;

said main wall station having a door installation button for remotely learning an operational profile of the door and door travel limits by said operator, wherein actuation of said door installation button remotely initiates door travel to find a first travel limit, remotely reverses door travel to find a second travel limit and then remotely initiates an open/close cycle to set said operational profile, said operator having safety features to detect the presence of any obstruction in the path of the door between door travel limits, wherein detection of the obstruction causes the operator to take corrective action;

said main wall station having a pet lock button for remotely setting a predetermined distance from one of said door travel limits, wherein actuation of said pet lock button moves the door to said predetermined distance; and said main wall station having a delay-close button for remotely initiating a close cycle by said operator, wherein actuation of said delay-close button delays closure of the door for a predetermined period of time, whereupon lapsing of said period of time said operator initiates door closure and enablement of the safety features.

* * * * *